United States Patent [19]
Wallace

[11] Patent Number: 5,536,160
[45] Date of Patent: Jul. 16, 1996

[54] APPARATUS AND METHOD FOR MANUFACTURING A WORK SURFACE

[75] Inventor: Richard C. Wallace, Irving, Tex.

[73] Assignee: Surfaces International LLC, Almont, Colo.

[21] Appl. No.: 321,027

[22] Filed: Oct. 5, 1994

[51] Int. Cl.⁶ .................................................. B29C 43/36
[52] U.S. Cl. .......................... 425/414; 249/117; 249/124; 249/140
[58] Field of Search ..................................... 249/122, 124, 249/125, 140, 64, 117; 425/412, 414

[56] References Cited

U.S. PATENT DOCUMENTS

| | | | |
|---|---|---|---|
| 952,272 | 3/1910 | Nieholls | 249/140 |
| 1,494,237 | 5/1924 | Haddad | 249/140 |
| 3,219,307 | 11/1965 | Leeds et al. | 249/140 |
| 4,168,140 | 9/1979 | Fontana et al. | 425/414 |
| 5,062,610 | 11/1991 | Woolford et al. | 249/124 |
| 5,370,353 | 12/1994 | Billson | 249/117 |

Primary Examiner—Khanh P. Nguyen
Attorney, Agent, or Firm—H. Dennis Kelly; Timmons & Kelly

[57] ABSTRACT

A solidifying liquid is placed into a mold having sides and a planar bottom. A plurality of separators are attached to the bottom of a support grid. The support grid is then placed onto the mold, with positioning projections extending through holes in the support grid. The liquid is then allowed to set, forming a work surface having a flat top surface and support ribs on its bottom surface.

6 Claims, 2 Drawing Sheets

APPARATUS AND METHOD FOR MANUFACTURING A WORK SURFACE

BACKGROUND OF THE INVENTION

1. Field of the Invention

This invention relates in general to the manufacture of work surfaces, such as hang-on office furniture work surfaces. In particular, the invention relates to an apparatus and a method for manufacturing a work surface by pouring a liquid into a mold and allowing the liquid to solidify.

2. Description of Related Art

Counter tops are commonly manufactured by pouring a liquid into a rectangular mold, and then curing the liquid by applying heat. This produces a work surface with a planar top and a planar bottom surface. A support structure of wood is built to support the work surface, and the work surface is placed on top of the support.

Recently, a new chemical formula has been developed for manufacturing work surfaces without having to apply heat to cure the material. This new material is self curing, and the liquid will set without being heated.

The new material is poured into a mold and allowed to set, forming a work surface having a planar top and a planar bottom surface. The work surface is then placed on a support structure.

Unfortunately, a work surface having planar top and bottom surfaces has a tendency to bend and warp, and is not self-supporting. When the work surface bends or warps, it will separate from the support structure, causing cracks.

Another disadvantage of the prior art is that it is difficult to use with hang-on wall brackets. The prior art work surfaces tends to deflect and sag when suspended from wall brackets.

SUMMARY OF THE INVENTION

The general object of the apparatus and method of the invention is to produce a work surface that is strong and light weight, and can be easily installed. In general, this object is accomplished by an apparatus including a mold having a planar bottom. A support grid lies on the mold and extends across the mold. A plurality of separators are attached to the lower side of the grid, and extend downward into the liquid in the mold to form support ribs across the bottom of the work surface.

The above, as well as additional objects, features, and advantages of the invention will become apparent in the following detailed description.

DESCRIPTION OF THE PREFERRED EMBODIMENT

Figure 1:
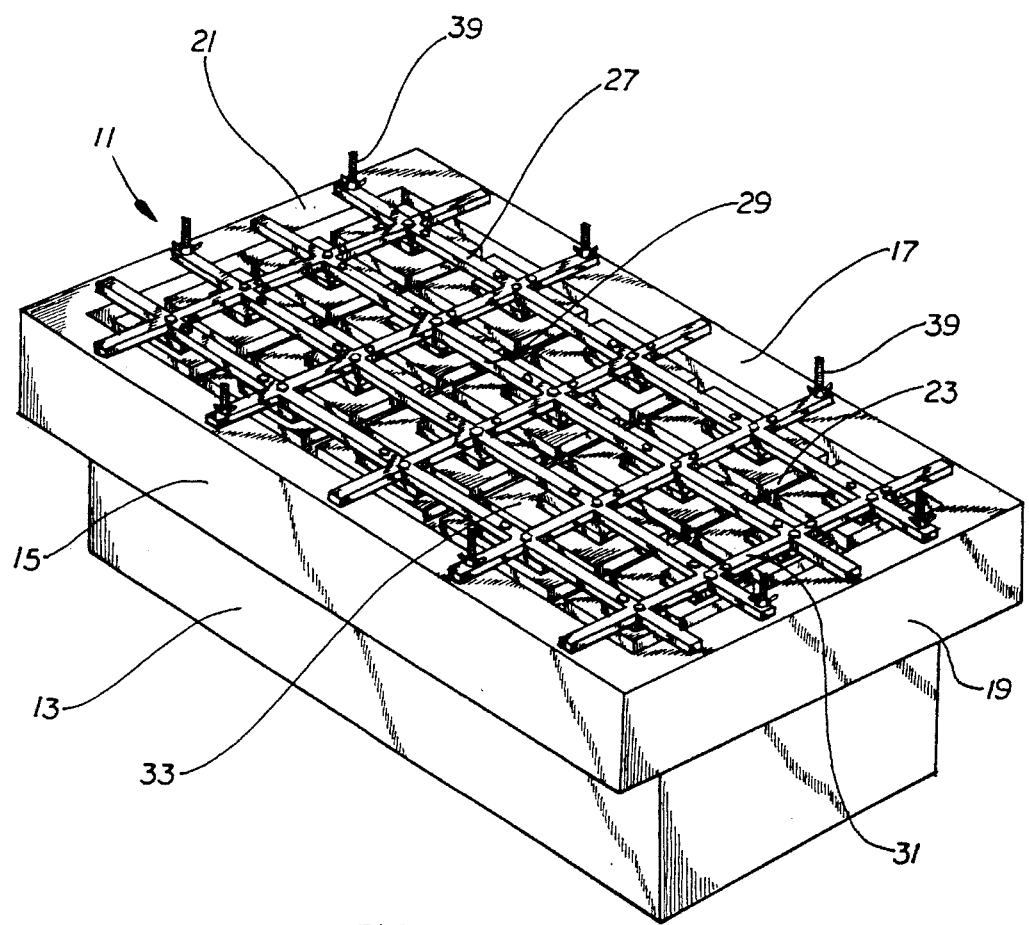
FIG. 1 is a perspective view of an apparatus according to the invention.
Figure 2:
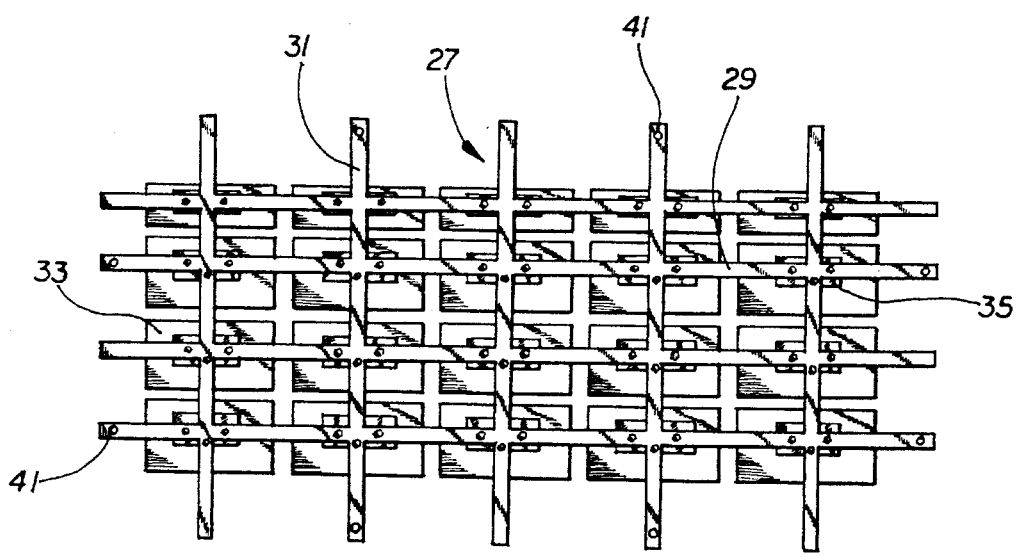
FIG. 2 is a top plan view of the support grid and the separators of the invention.
Figure 3:
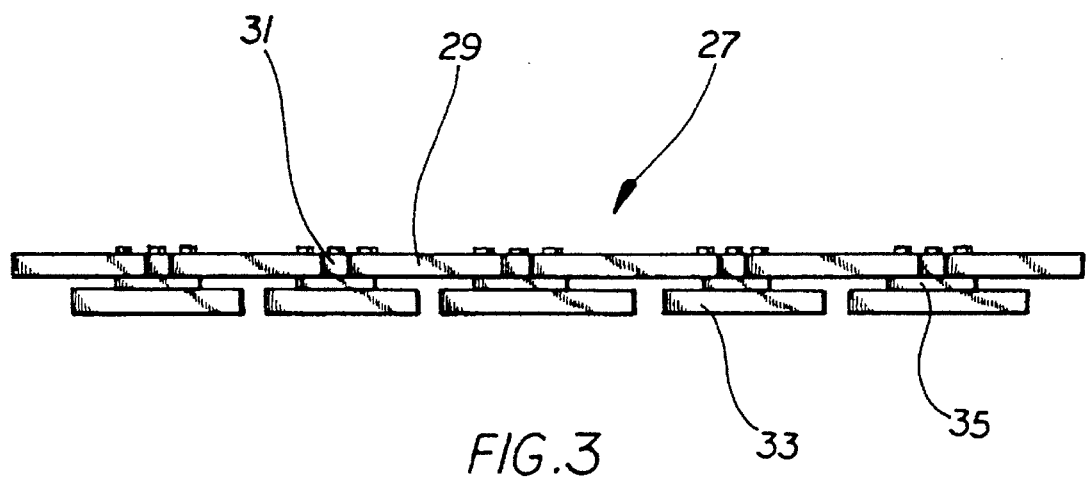
FIG. 3 is a front elevation of the support grid and the separators of the invention.

The preferred embodiment of the apparatus of the invention is illustrated in FIGS. 1–3. The apparatus includes a mold 11. The mold 11 is mounted on a support pedestal 13, to raise the mold 11 to a convenient height.

Figure 4:
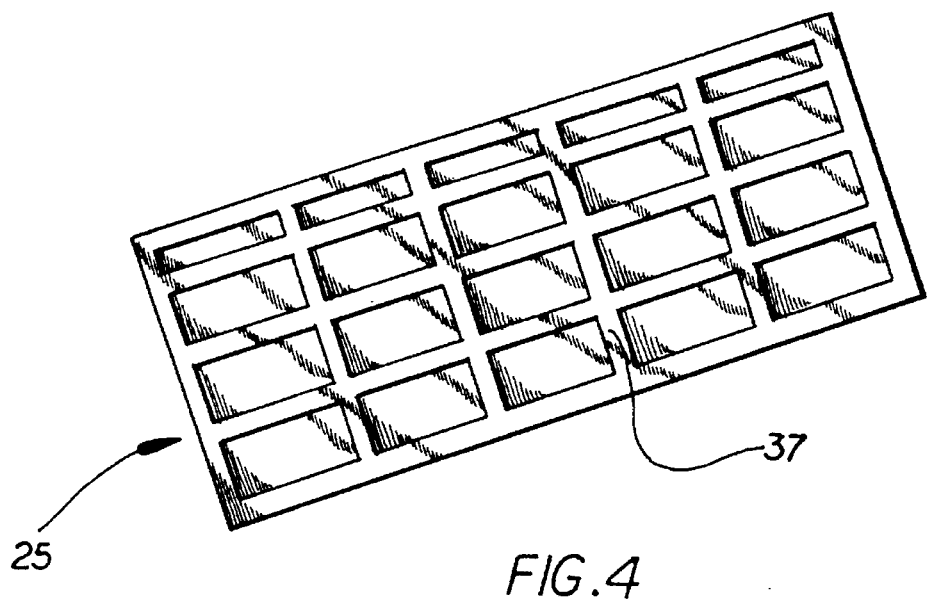
FIG. 4 is a bottom plan view of the work surface formed by the apparatus and method of the invention.

The mold 11 includes four sides 15, 17, 19, and 21, extending around a planar bottom 23. A mold 11 of this shape will produce a rectangular work surface 25, as shown in FIG. 4, having a flat surface on the top. Of course, if desired, the mold 11 might have other shapes in order to produce a work surface having a different shape.

The mold 11 is designed to hold and to form a liquid chemical composition that will solidify without the application of heat. Such compositions are know in the art, and can be obtained commercially. After setting, the material can have the appearance of marble or granite, or may have any of several different colors. The material can be polished to give the surface a bright shine, if desired.

The liquid chemical composition is poured into the mold 11. Then, a support grid 27 is placed over the top of the mold 11. The support grid 27 consists of several parallel straight rods 29, extending from one side 19 of the mold 11 to the opposite side 21 of the mold 11. The support grid 27 also has several parallel straight rods 31, extending from one side 15 of the mold 11 to the other side 17 of the mold 11. The first set of rods 29 are perpendicular to the second set of rods 31. All of the rods 29 and 31 lie within the same plane, as seen best in FIG. 3.

A plurality of separators 33 are connected to the lower side of the support grid 27. Each separator 33 is connected to the support grid 27 at the intersection between two perpendicular rods 29 and 31. If necessary, there may be a spacer 35 mounted between the separator 33 and the support grid 27.

Each separator 33 is rectangular, and approximately one inch (2.54 centimeters) thick. When the support grid 27 is placed on the mold 11, the separators 33 extend downward into the liquid. The separators 33 are spaced apart to form support ribs 37 on the bottom of the work surface 11, as seen in FIG. 4.

The size and spacing of the separators 33 depends upon the ultimate design of the work surface 25. The size of a typical separator may be between five inches (12.7 centimeters) and nine inches (22.9 centimeters) on each side and about one inch (2.54 centimeters) thick. The separators 33 will typically be spaced about one inch (2.54 centimeters) apart. The separators will extend into the liquid to within about one quarter inch (0.6 centimeters) of the bottom 23 of the mold 11.

Several positioning projections 39 extend upward from the sides 15, 17, 19, and 21 of the mold 11. When the support grid 27 is laid upon the mold 11, the projections 39 pass through holes 41 in the ends of some of the rods 29 and 31. The projections 39 are threaded, and wing nuts 43 can be placed on the projections 39 to secure the support grid 27.

The method of the invention is a method for manufacturing a work surface 25 having a top and a bottom. The first step is pouring a liquid into the mold 11 having sides 15, 17, 19, and 21, and a planar bottom 23 for forming a flat surface on the top of the work surface 25 as the liquid solidifies. Then, the separators 33 are attached to the lower side of the support grid 27. The support grid 27 is then placed across the top of the mold 11 to position the separators 33 in the liquid to form support ribs 37 across the bottom of the work surface 25 when the liquid solidifies.

The apparatus and method of the invention have several advantages over the prior art. The apparatus is relatively inexpensive to manufacture and to maintain. The resulting work surface 25 is stronger and less likely to warp and bend than work surfaces manufactured with prior art methods.

The invention has been described in only one embodiment. It should be apparent to those skilled in the art that the invention is not so limited, but is susceptible to various changes and modifications without departing from the spirit of the invention.

I claim:

1. An apparatus for manufacturing a work surface having a top and a bottom, comprising:

a mold having sides and a planar bottom for containing a quantity of liquid and for forming a flat surface on the top of the work surface as the liquid solidifies;

a support grid lying on the mold and extending across the mold from one side to another side;

a plurality of separators attached to the lower side of the support grid and extending downward into the liquid, wherein the separators are spaced apart to form support ribs across the bottom of the work surface.

2. An apparatus as recited in claim 1, wherein the separators are rectangular.

3. An apparatus as recited in claim 1, wherein the support grid includes a first straight rod extending from one side of the mold to the opposite side of the mold.

4. An apparatus as recited in claim 3, wherein the support grid includes a second straight rod, parallel to the first rod, and extending from one side of the mold to the opposite side of the mold.

5. An apparatus as recited in claim 4, further comprising a plurality of positioning projections, extending upward from the sides of the mold and passing through holes in the rods for properly positioning the separators in the mold.

6. An apparatus as recited in claim 5, wherein the support grid includes a third straight rod, perpendicular to the first and second rods, and extending from one side of the mold to the opposite side of the mold.

* * * * *